Patented June 18, 1940

2,204,772

UNITED STATES PATENT OFFICE 2,204,772

PLASTIC MATERIAL

Joseph Rivkin, Pittsburgh, and Robert C. Scheib, Avalon, Pa., assignors to The Neville Company, Pittsburgh, Pa., a corporation of Pennsylvania No Drawing. Application January 11, 1937, Serial No. 120,139

12 Claims. (Cl. 106—7)

This invention relates to compositions and products embodying plastic properties together with a combination of melting point and pliability which adapt them for uses over ranges of temperature, and it relates particularly to mastic floor tile.

In certain uses of organic plastics it is desirable that the material possess a maximum melting point together with a pliability compatible with the conditions of use and which is satisfactorily retained in the temperature range within which the material is used. Most resinous materials available for such uses do not provide this combination of properties. Thus, if sufficiently high melting to retain the desired firmness at high temperatures encountered in use, they generally are too brittle at the lower temperatures at which they are used. Similarly, if they are sufficiently non-brittle at the lower temperatures, they tend to become too soft at the higher temperatures.

The melting point of such organic plastic materials is used as a measure of the firmness and hardness which the material will exhibit at the normal and high temperatures of use. Thus, the higher the melting point of the material, the harder and firmer it will be at normal temperatures, as well as at the elevated temperatures to which it may be exposed in normal use. It is, therefore, desirable to provide as high a melting point as possible consistent with a minimum of brittleness at the lower temperatures to which the material may be exposed in use.

The pliability of these materials at the temperatures of use in commonly gauged by the penetration test, in which there is measured the distance which a standard needle under a standard load will penetrate into the material at a standard temperature in a standard length of time. The penetration values necessary differ according to the particular applications, but for any particular use the penetration value can not be below a certain minimum. In the production of mastic floor tile, for example, it is generally specified that the binder shall have a melting point of at least 80° C., determined by the ring and ball method, and a penetration of at least 3, determined by the needle method using a 100 gm. load at 25° C. for five seconds.

In a copending application filed by one of us, Serial No. 120,138, filed January 11, 1937, there is disclosed the treatment of pure still residues to separate them into useful products. The term pure still residues has reference to the material left in the stills in the purification of the cuts resulting from the fractionation of the light oils recovered in the operation of by-product coke ovens. More specifically, the common practice is to scrub the oven gases with a high boiling petroleum wash oil to remove the aromatic light oils in the form of a solution in the wash oil. The solution is then distilled to produce a mixture of light oils, chiefly benzol, toluol, xylol, and naphtha, which mixture is then fractionated to obtain impure cuts of the individual constituents. These crude fractions, or cuts, after having been acid washed and subsequently neutralized with alkali, are then distilled in the so-called "pure stills" to produce commercially pure solvents. The residues in the pure stills contain complex mixtures of polymerized materials and high boiling oils, together with inorganic, or mineral, matter, and these residues are termed in the trade pure still residues.

In the practice of the invention disclosed in the aforesaid application, the pure still residues are treated with a petroleum solvent, such as petroleum benzine, gasoline, mineral spirits, or kerosene, whereby there is dissolved a portion of the pure still residue material. The remainder remains undissolved and may be recovered by filtration from the solution. This material is of low solubility in petroleum spirits, it is substantially infusible, generally dark in color and opaque, and substantially non-saponifiable. Also, it contains varying amounts of inorganic, or mineral, matter.

We have discovered, and it is upon this that the present invention is predicated, that the portion of such pure still residues which is insoluble in petroleum solvents is particularly suitable for the production of plastic compositions and products of the type referred to herein. More particularly, we have found that desirable combinations of high melting point and penetration, or pliability, may be provided by compounding the insoluble portion of the pure still residues with a tempering agent in proportions adapted to give the desired melting point and penetration characteristics. As tempering agents there may be used various materials such as thermo-plastic resins or high boiling oils, and most suitably combinations of both types of tempering agents.

Thus it is possible through the practice of the invention to produce compositions exhibiting unusually high melting points coupled with unusually high penetration, whereby there are provided plastic compositions representing the desired plasticity characteristics, and by varying the particular tempering agents and the proportions used the melting point and pliability are susceptible of adjustment relative to each other, according to the particular characteristics desired in the final product. Thus, where both high boiling oils and thermo-plastic resins are used, it is possible by varying the proportions of the three ingredients of the compound to obtain a wide range of combinations of melting point and penetration.

The outstanding fact in all such compositions is that for the penetration of any given compound the melting point is far higher than the melting point of most thermo-plastic resins of the same penetration would be. In other words, any combination of the three ingredients will retain its consistency, considered in terms of hardness and pliability, over a wider temperature range than would most thermo-plastic resins possessing the same consistency at normal temperatures. Accordingly, in the practice of the invention compositions are provided which are useful for the purposes to which these plastic materials are applied commercially, such as in the manufacture of mastic floor tile, bituminous enamels for protective coatings for pipes, and the like.

Various types of thermo-plastic resins may be used in the practice of the invention, such as coumarone-indene resins, the acryloid resins, the styrene resins, rosin ester, petroleum resins, especially of the polymerized diolefine type, and other thermo-plastic resins known in the art. For this purpose there may be used also the resin recovered by petroleum solvent extraction from pure still residues, as referred to hereinabove and as disclosed and claimed in the aforesaid application of Joseph Rivkin. The various resins referred to possess different melting points, and thus by appropriate selection of the resin and its proportioning to the other ingredients of the composition the melting point of the product may be varied according to need.

As exemplifying the different combinations of properties attainable in the practice of the invention, reference may be made to the following compositions produced in accordance with it.

*Example 1.*—A composition was prepared from 49 per cent by weight of the insoluble portion of pure still residues produced in accordance with the aforementioned patent application, 38 per cent of coumarone-indene resin having a melting point of about 100° C., and 13 per cent of high boiling oil. This composition exhibited a melting point of 116° C., determined by the ring and ball method, and a penetration of 17, determined by the needle method using a 100 gm. load applied for five seconds at 25° C.

*Example 2.*—This composition was made from 46 per cent by weight of the insoluble portion of pure still residue, 32 per cent of thermo-plastic resin like that used in Example 1, and 22 per cent of high boiling oil. Its melting point was 86° C., and its penetration was 43.

The term "high boiling oils" as used herein has reference to oils boiling at about 300° C., preferably above 300° C. In the two examples just given, the oil used was an aromatic oil boiling between 300° C. and 370° C., and consisting essentially of dimers of coumarone and indene. Other oils, however, may be used provided they are sufficiently high boiling, of low enough volatility and compatible with the resinous components. The oils boiling above 300° C., recovered from pure still residue could be used, for instance. Likewise, petroleum oils of similar boiling range could be used either in conjunction with other oils or by themselves, depending on the resin used in conjunction with them.

The compositions may be made up in various ways, it being immaterial, in general, in what order the ingredients are mixed, or in what manner, providing the resultant product is sufficiently homogeneous. One mode of compounding which has been found to be satisfactory is to filter the insoluble material resulting from treatment of pure still residue with petroleum solvent, to collect a filter cake which is wet with petroleum solvent. The wet filter cake is mixed with the high boiling oil used as one of the ingredients of the composition, and the mixture is heated to a temperature at which the thermo-plastic resin constituting the third ingredient is quite fluid. The melted thermo-plastic resin is now added and the mix is kept heated while agitating it mechanically, to effect complete evaporation of the petroleum solvent which was carried by the filter cake. By the time the petroleum solvent has evaporated the mix is sufficiently homogeneous and ready to be cooled and used.

Another mode of compounding these materials is to dry the filter cake, and powder it. The dried and powdered material is now added to the heated thermo-plastic resin and masticated on heated rolls with the gradual addition of the high boiling oil to the point where the entire mix is homogeneous.

The compositions provided by the invention have been found to be particularly adapted to the manufacture of mastic floor tile. Tile of this type consists essentially of mineral filler pigment, or color, and a thermo-plastic organic cementing material which acts to bind the fillers and pigments or colors. The properties of the tile are dependent in large part upon the binder, which should be plastic and yield a tile which is neither too brittle nor too soft at normal temperature of use, and which shows a minimum of softening at any temperature above normal to which it may be ordinarily subjected. Consequently the binder must retain its consistency, in terms of hardness and pliability, over a relatively wide temperature range, being of the proper hardness and pliability at normal temperature, not becoming too brittle at ordinarily depressed temperatures, nor too soft at ordinarily elevated temperatures.

Heretofore in the manufacture of darker colored floor tile these requirements have been supplied by asphaltic binders, such as blown petroleum asphalt. The black color of the asphalts precludes their use, however, for the manufacture of lighter colored tile, and even in the production of the darker colored tile it makes necessary the use of rather high proportions of coloring materials, which increases the costs of the tile.

The trade has recognized the need for a lighter colored binder possessing temperature-susceptibility properties similar to those provided by blown asphalt. Most resinous materials available for such use do not provide the necessary properties, as just described, because of their susceptibility to the influence of temperature. Generally speaking, if the resins are sufficiently high melting to retain the firmness desired at the higher temperatures occurring in use, they are too brittle at the lower temperatures, or if sufficiently non-brittle at the lower temperatures, they become too soft at elevated temperatures such as may be encountered.

One mode of obtaining lighter colored binders whose temperature-susceptibility properties resemble those of blown asphalt has been by combining hard and brittle thermo-plastic resins with fatty acid pitches. The resulting mass possesses temperature-susceptibility properties resembling those of blown petroleum asphalt, but its use involves the disadvantages that the fatty acid pitches show poor resistance to alkalies, and they can not be obtained in uniform quality. These characteristics are particular disadvantages in connection with floor tile because alkaline detergents thus may cause unduly rapid destruction of the tile, and because control of manufacturing operations becomes complicated due to the non-uniformity of the pitches.

We have discovered that the compositions described hereinabove are especially useful in the production of mastic floor tile, not only in providing the necessary temperature-susceptibility properties, but also in repressing or eliminating the foregoing and other disadvantages. For instance, the products obtained from pure still residues used in the practice of the present invention are non-saponifiable, whereby the resultant tile are resistant to the action of the detergents ordinarily used in cleaning floors. Also, the material can be supplied of uniform quality, thus rendering production operations simpler. Again, these materials, and the compositions described hereinabove, are lighter in color than asphalts, thus supplying the need in the trade.

These compositions may be used as binders generally in the production of mastic floor tile irrespective of the particular fillers, or combinations of fillers, or pigments and colors, used in their production, and this aspect of the invention thus resides in the use of these compositions as binders, not in the use of any specific filler, pigment or color.

As exemplifying the application of the invention to the manufacture of mastic floor tile, such tile may be made from a composition of 35 parts of limestone dust and 35 parts of asbestos as fillers, 1 part of color, and 18 parts of a composition formed from the insoluble portion of pure still residue together with a tempering agent, suitably a composition in accordance with the foregoing examples.

The ingredients are combined in any suitable manner, as by means of a Banbury mixer, and the resulting heated plastic mix is worked through sheeter rolls and calender rolls in the usual sequence, followed by cutting to size.

According to the provisions of the patent statutes, we have explained the principle and manner of practicing our invention and have described what we now consider to represent its best embodiment. However, we desire to have it understood that, within the scope of the appended claims, the invention may be practiced otherwise than as specifically described.

We claim:

1. As a new article of manufacture, a plastic composition containing a material that is substantially infusible, substantially non-saponifiable, of low solubility in petroleum solvents, and contains inorganic matter, produced as an insoluble residue of the treatment of pure still residue, resultant from fractionation of light oil recovered in by-product coke oven operation, with petroleum solvent, and a tempering agent for said material.

2. As a new article of manufacture, a plastic composition containing a material that is substantially infusible, substantially non-saponifiable, of low solubility in petroleum solvents, and contains inorganic matter, produced as an insoluble residue of the treatment of pure still residue, resultant from fractionation of light oil recovered in by-product coke oven operation, with petroleum solvent, and a high boiling oil mixed intimately with said material.

3. As a new article of manufacture, a plastic composition containing a material that is substantially infusible, substantially non-saponifiable, of low solubility in petroleum solvents, and contains inorganic matter, produced as an insoluble residue of the treatment of pure still residue, resultant from fractionation of light oil recovered in by-product coke oven operation, with petroleum solvent, and a tempering agent for said material comprising thermo-plastic resin.

4. As a new article of manufacture, a plastic composition containing a material that is substantially infusible, substantially non-saponifiable, of low solubility in petroleum solvents, and contains inorganic matter, produced as an insoluble residue of the treatment of pure still residue, resultant from fractionation of light oil recovered in by-product coke oven operation, with petroleum solvent, and a tempering agent for said material comprising high boiling oil and thermo-plastic resin.

5. That method of producing plastic material comprising intimately mixing a material that is substantially infusible, substantially non-saponifiable, of low solubility in petroleum solvents, and contains inorganic matter, produced as an insoluble residue of treatment of pure still residues, resultant from fractionation of light oil recovered in by-product coke oven operation, with petroleum solvent, and a tempering agent in proportions productive of desired melting point and penetration of the mixture.

6. That method of producing plastic material comprising intimately mixing a material that is substantially infusible, substantially non-saponifiable, of low solubility in petroleum solvents, and contains inorganic matter, produced as an insoluble residue of treatment of pure still residues, resultant from fractionation of light oil recovered in by-product coke oven operation, with petroleum solvent, and a thermo-plastic resin in proportions productive of desired melting point and penetration of the mixture.

7. That method of producing plastic material comprising intimately mixing a material that is substantially infusible, substantially non-saponifiable, of low solubility in petroleum solvents, and contains inorganic matter, produced as an insoluble residue of treatment of pure still residues, resultant from fractionation of light oil recovered in by-product coke oven operation, with petroleum solvent, and a tempering agent comprising high boiling oil and thermo-plastic resin in proportions productive of desired melting point and penetration of the mixture.

8. A mastic floor tile composition comprising filler, and a binder composed of a material that is substantially infusible, substantially non-saponifiable, of low solubility in petroleum solvents, and contains inorganic matter, produced as an insoluble residue of the treatment of pure still residue, resultant from fractionation of light oil recovered in by-product coke oven operation, with petroleum solvent, and a tempering agent for said material.

9. A mastic floor tile composition comprising filler, and a binder composed of a material that is substantially infusible, substantially non-saponifiable, of low solubility in petroleum solvents, and contains inorganic matter, produced as an insoluble residue of the treatment of pure still residue, resultant from fractionation of light oil recovered in by-product coke oven operation, with petroleum solvent, and a high boiling oil tempering agent for said material.

10. A mastic floor tile composition comprising filler, and a binder composed of a material that is substantially infusible, substantially non-saponifiable, of low solubility in petroleum solvents, and contains inorganic matter, produced as an insoluble residue of the treatment of pure still residue, resultant from fractionation of light oil recovered in by-product coke oven operation, with petroleum solvent, and a tempering agent for said material comprising high boiling oil and thermo-plastic resin.

11. A mastic floor tile composition comprising filler, color, and a binder composed of a material that is substantially infusible, substantially non-saponifiable, of low solubility in petroleum solvents, and contains inorganic matter, produced as an insoluble residue of the treatment of pure still residue, resultant from fractionation of light oil recovered in by-product coke oven operation, with petroleum solvent, and a tempering agent for said material, said materials being in proportions providing desired melting point and penetration.

12. A mastic floor tile composition comprising about 35 parts of limestone dust, about 35 parts of asbestos, 1 part of color and about 18 parts of a compound comprising a material that is substantially infusible, substantially non-saponifiable, of low solubility in petroleum solvents, and contains inorganic matter, produced as an insoluble residue of treatment of pure still residues, resultant from fractionation of light oil recovered in by-product coke oven operation, with petroleum solvent, together with high boiling oil and thermoplastic resin in proportions productive of desired melting point and penetrability.

JOSEPH RIVKIN.
ROBERT C. SCHEIB.